(12) United States Patent
Varaprasad et al.

(10) Patent No.: US 9,272,949 B2
(45) Date of Patent: Mar. 1, 2016

(54) COATED GLASS SUBSTRATE WITH HEAT TREATABLE ULTRAVIOLET BLOCKING CHARACTERISTICS

(75) Inventors: Desaraju V. Varaprasad, Ann Arbor, MI (US); David B. Orleans, Livonia, MI (US); Zhongming Wang, Ypsilanti, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 12/805,069

(22) Filed: Jul. 9, 2010

(65) Prior Publication Data

US 2012/0009388 A1 Jan. 12, 2012

(51) Int. Cl.
| | | |
|---|---|---|
| B05D 1/30 | (2006.01) | |
| B05D 3/08 | (2006.01) | |
| C03C 17/42 | (2006.01) | |
| C03C 17/00 | (2006.01) | |

(52) U.S. Cl.
CPC .............. *C03C 17/42* (2013.01); *C03C 17/002* (2013.01); *C03C 2217/74* (2013.01); *C03C 2218/355* (2013.01); *Y10T 428/24612* (2015.01)

(58) Field of Classification Search
CPC .... C03C 17/002; C03C 17/42; C03C 2217/74
USPC ........................................................ 427/420
See application file for complete search history.

(56) References Cited

U.S. PATENT DOCUMENTS

| | | | |
|---|---|---|---|
| 3,382,528 A | 5/1968 | Noble | |
| 4,361,598 A | 11/1982 | Yoldas | |
| 4,510,344 A | 4/1985 | Berman | |
| 4,694,218 A | 9/1987 | Chao | |
| 4,792,536 A | 12/1988 | Pecoraro et al. | |
| 4,806,436 A | 2/1989 | Tada et al. | |
| 4,816,333 A | 3/1989 | Lange et al. | |
| 4,830,879 A | 5/1989 | Debsikdar | |
| 5,214,008 A | 5/1993 | Beckwith et al. | |

(Continued)

FOREIGN PATENT DOCUMENTS

| | | |
|---|---|---|
| EP | 0 811 583 | 12/1997 |
| EP | 1 016 637 | 7/2000 |

(Continued)

OTHER PUBLICATIONS

Switzer et al. U.S. National Museum, Washington, D.C. 1954.*

(Continued)

*Primary Examiner* — Alexander Weddle
(74) *Attorney, Agent, or Firm* — Nixon & Vanderhye P.C.

(57) ABSTRACT

Certain example embodiments of this invention relate to the development of temperable UV blocking coatings having enhanced UV blocking efficiency and aesthetic appearance on stock sheets of glass substrates using large-scale wet coating manufacturing methods. A glass substrate is provided. A base coat is curtain coated on the glass substrate from a oxide precursor material including zinc, cerium, titanium, and silicon precursor materials. The base coat is cured. A top coat is roll coated, directly or indirectly, on the base coat, with the top coat being a sacrificial cross-linked organic polymer-based layer. The substrate is heat treated with the base coat and the top coat thereon. The base coat and the top coat are substantially uniform in thickness, and the heat treating removes substantially all of the top coat while causing substantially no cracking in the base coat.

19 Claims, 7 Drawing Sheets

(56) References Cited

U.S. PATENT DOCUMENTS

| | | |
|---|---|---|
| 5,328,975 A | 7/1994 | Hanson et al. |
| 5,371,138 A | 12/1994 | Schaefer et al. |
| 5,401,287 A | 3/1995 | Pecoraro et al. |
| 5,480,722 A | 1/1996 | Tomonaga et al. |
| 5,744,227 A | 4/1998 | Bright et al. |
| 5,783,049 A | 7/1998 | Bright et al. |
| 5,830,252 A | 11/1998 | Finley et al. |
| 5,883,030 A | 3/1999 | Bako et al. |
| 5,948,131 A | 9/1999 | Neuman |
| 5,964,962 A | 10/1999 | Sannomiya et al. |
| 5,977,477 A | 11/1999 | Shiozaki |
| 6,013,372 A | 1/2000 | Hayakawa et al. |
| 6,284,377 B1 | 9/2001 | Veerasamy |
| 6,303,225 B1 | 10/2001 | Veerasamy |
| 6,372,327 B1 | 4/2002 | Burnham et al. |
| 6,403,509 B2 | 6/2002 | Cochran et al. |
| 6,407,021 B1 | 6/2002 | Kitayama et al. |
| 6,495,482 B1 | 12/2002 | de Sandro et al. |
| 6,498,118 B1 | 12/2002 | Landa et al. |
| 6,503,860 B1 | 1/2003 | Dickinson et al. |
| 6,506,622 B1 | 1/2003 | Shiozaki |
| 6,521,558 B2 | 2/2003 | Landa et al. |
| 6,573,207 B2 | 6/2003 | Landa et al. |
| 6,576,349 B2 | 6/2003 | Lingle et al. |
| 6,592,992 B2 | 7/2003 | Veerasamy |
| 6,610,622 B1 | 8/2003 | Landa et al. |
| 6,632,491 B1 | 10/2003 | Thomsen et al. |
| 6,716,780 B2 | 4/2004 | Landa et al. |
| 6,723,211 B2 | 4/2004 | Lingle et al. |
| 6,749,941 B2 | 6/2004 | Lingle |
| 6,776,007 B2 | 8/2004 | Hirota et al. |
| 6,787,005 B2 | 9/2004 | Laird et al. |
| 6,796,146 B2 | 9/2004 | Burnham |
| 6,846,760 B2 | 1/2005 | Siebers et al. |
| 6,863,928 B2 | 3/2005 | Stachowiak |
| 6,878,403 B2 | 4/2005 | Veerasamy et al. |
| 6,887,575 B2 | 5/2005 | Neuman et al. |
| 6,916,408 B2 | 7/2005 | Laird et al. |
| 6,926,967 B2 | 8/2005 | Neuman et al. |
| 6,936,347 B2 | 8/2005 | Laird et al. |
| 6,942,923 B2 | 9/2005 | Stachowiak |
| 6,967,060 B2 | 11/2005 | Stachowiak |
| 6,974,630 B1 | 12/2005 | Stachowiak |
| 7,012,115 B2 | 3/2006 | Asahina et al. |
| 7,033,649 B2 | 4/2006 | Veerasamy |
| 7,081,302 B2 | 7/2006 | Lemmer et al. |
| 7,288,283 B2 | 10/2007 | Wang et al. |
| 7,446,939 B2 | 11/2008 | Sharma et al. |
| 7,700,869 B2 | 4/2010 | Thomsen |
| 7,700,870 B2 | 4/2010 | Thomsen |
| 2002/0090519 A1 | 7/2002 | Kursawe et al. |
| 2002/0122962 A1 | 9/2002 | Arfsten et al. |
| 2003/0179476 A1 | 9/2003 | Kobayashi et al. |
| 2004/0028918 A1 | 2/2004 | Becker et al. |
| 2004/0058079 A1 | 3/2004 | Yamada et al. |
| 2004/0071986 A1 | 4/2004 | Shoshi et al. |
| 2004/0121896 A1 | 6/2004 | Landa et al. |
| 2004/0209757 A1 | 10/2004 | Landa et al. |
| 2004/0248995 A1 | 12/2004 | Glaubitt et al. |
| 2004/0258929 A1 | 12/2004 | Glaubitt et al. |
| 2005/0195486 A1 | 9/2005 | Sasaki et al. |
| 2005/0210921 A1* | 9/2005 | Richardson et al. ............ 65/23 |
| 2005/0233146 A1* | 10/2005 | Nonninger ............... 428/402 |
| 2006/0019114 A1 | 1/2006 | Thies et al. |
| 2007/0064446 A1 | 3/2007 | Sharma et al. |
| 2007/0065670 A1* | 3/2007 | Varaprasad ............... 428/432 |
| 2007/0074757 A1 | 4/2007 | Mellott et al. |
| 2007/0128449 A1* | 6/2007 | Taylor et al. ............... 428/432 |
| 2007/0146889 A1 | 6/2007 | Wang et al. |
| 2007/0243391 A1* | 10/2007 | Varaprasad ............... 428/426 |
| 2008/0141694 A1 | 6/2008 | Sharma |
| 2008/0185041 A1 | 8/2008 | Sharma |
| 2008/0268260 A1* | 10/2008 | Varaprasad et al. .......... 428/429 |
| 2009/0004482 A1 | 1/2009 | Sharma |
| 2009/0044897 A1* | 2/2009 | Thomsen et al. ............. 156/150 |
| 2009/0053645 A1* | 2/2009 | Sharma ................. 430/270.1 |
| 2009/0075092 A1 | 3/2009 | Varaprasad |
| 2009/0181256 A1 | 7/2009 | Sharma |

FOREIGN PATENT DOCUMENTS

| | | |
|---|---|---|
| EP | 1 329 433 | 7/2003 |
| JP | 07-025646 | 1/1995 |
| JP | 07-122764 | 5/1995 |
| JP | 07-178784 | 7/1995 |
| JP | 11-60269 | 3/1999 |
| JP | 2007-209971 | 8/2007 |

OTHER PUBLICATIONS

U.S. Appl. No. 12/591,225, Sharma et al., filed Nov. 12, 2009.
European Search Report dated Apr. 23, 2009.
"Colored Glasses" Weyl; The Society of Glass Technology 1951, (4pgs).
"Colour Generation and Control in Glass", Bamford, Glass Science and Technology , 2, 1977 (3pgs).
"Photovoltaic Module Performance and Durability Following Long-Term Field Exposure", King et al., Sandia National Laboratories, (19pgs), Prog. Photovolt. Rea. Appl. 2000; 8: 241-256.
"Antireflection of Glazings for Solar Energy Applications", Nostell et al., Solar Energy Materials and Solar Cells 54 (1988) pp. 223-233.
"Anti-reflection (AR) Coatings Made by Sol-Gel Process: A Review", Chen, Solar Energy Materials and Solar Cells 68 (2001) pp. 313-336.
"Silica Antireflective Films on Glass Produced by the Sol-Gel Method", Bautista et al., Solar Energy Materials and Solar Cells 80 (2003) pp. 217-225.

* cited by examiner

COATED GLASS SUBSTRATE WITH HEAT TREATABLE ULTRAVIOLET BLOCKING CHARACTERISTICS

Certain example embodiments of this invention relate to a coated glass substrate having an ultraviolet (UV) blocking coating which may be heat resistant and may be subjected to high temperatures such as those used during thermal tempering of glass, and/or a method of making the same. In certain example embodiments of this invention, a UV blocking layer(s) is formed on a glass substrate, and may or may not be provided over a multi-layer low-E (low emissivity) coating. Thus, in certain example instances, the overall coating is capable of blocking significant amounts of infrared (IR) and/or UV radiation.

BACKGROUND AND SUMMARY OF EXAMPLE EMBODIMENTS OF THE INVENTION

Heat resistant UV blocking coatings are known in the art. For example, see U.S. patent documents U.S. Pat. No. 5,480,722 and 2002/0122962A1.

Wet chemical routes to produce heat resistant UV blocking coatings based on cerium oxide are known. Cerium oxide also may be combined with silica and/or titania to enhance the quality of the films. For instance, the addition of titania further enhances the UV blocking efficiency of ceria. Unfortunately, however, the resulting films tend to produce a yellowed transmitted color. Also, the refractive index of ceria-titania composite coatings tend to be significantly higher than that of flat glass substrates, which are normally used to support deposited coatings for window applications. As a result, these coatings tend to be highly reflective and also tend to exhibit an interference color pattern, which are generally undesirable for window applications.

In order to suppress these undesired effects, multi-layer oxide coatings of varying indexes have been tried. Unfortunately, however, the application of multiple oxide layers is not attractive for commercial applications, including wet chemical methods, because of the complexity of manufacturing processes and associated higher yield losses.

Interference effects of high refractive index ceria-titania coatings also may be reduced by increasing coating thickness. Unfortunately, however, thicker coatings tend to be undesirably yellow.

The addition of silica to ceria and ceria-titania coatings also could significantly reduce the refractive index of the coatings. Thus, reflection and interference effects of the resultant coatings could be reduced. Because silica is transparent in the UV region, the addition of higher levels of silica to ceria-based coatings increases coating thickness requirements in order to achieve adequate UV blocking. The higher the thickness, however, the greater the tendency for coatings to develop micro-cracks during high temperature heat treatment processes such as, for example, tempering and heat strengthening of glass substrates.

In view of the foregoing, it will be appreciated that there is a need in the art for UV blocking coatings having enhanced UV blocking efficiency, aesthetic appearances that have reduced amounts of undesirable optical effects (such as yellowish color, interference patterns, etc.), and that are less likely to develop micro-cracks after high temperature heat treatment. It also will be appreciated that there is a need in the art for methods of making the same.

The term "substantially crack-free" does not imply the absence of all cracks; rather, it means that to the extent that any cracks form in the coating during production, the cracks (if any) do not substantially interfere with the overall structure, function, and operation of the UV coating, either alone or in the layered stack.

In certain example embodiments of this invention, a method of making a coated article is provided. A glass substrate is provided. A base coat is curtain coated on the glass substrate, with the base coat including zinc, cerium, titanium, and silicon. The base coat is cured. A top coat is roll coated, directly or indirectly, on the base coat, with the top coat being a sacrificial cross-linked organic polymer-based layer. The substrate is heat treated with the base coat and the top coat thereon. The base coat and the top coat vary in thickness by no more than 15% prior to the heat treating.

In certain example embodiments of this invention, a method of making a coated article is provided. A glass substrate is provided, with the glass substrate having thereon (a) a base coat curtain coated from an oxide precursor material including zinc, cerium, titanium, and silicon, and (b) a sacrificial cross-linked organic polymer-based top coat roll coated on the base coat. The substrate is heat treated with the base coat and the top coat thereon, with the heat treating removing substantially all of the top coat from the base coat and causing substantially no cracks to form in the base coat. The base coat is formed from an oxide precursor comprising 40-80 mol % zinc, 5-50 mol % ceria and titania, and 0-10 mol % silane. The base coat and the top coat vary in thickness by no more than 10% prior to the heat treating.

In certain example embodiments of this invention, a coated article is provided. The coated article includes a glass substrate. A base coat is on the glass substrate, with the base coat including zinc, cerium, titanium, and silicon and being curtain coated from an oxide precursor material. A sacrificial cross-linked organic polymer-based top coat is roll coated on the base coat. The substrate with the base coat and the top coat thereon are heat treatable such that substantially all of the top coat is removable from the base coat while causing substantially no cracks to form in the base coat. The base coat is formed from an oxide precursor comprising 40-80 mol % zinc, 5-50 mol % ceria and titania, and 0-10 mol % silane. The base coat and the top coat are applied so as to vary in thickness by no more than 5% prior to any heat treatment.

The features, aspects, advantages, and example embodiments described herein may be combined to realize yet further embodiments.

DETAILED DESCRIPTION OF EXAMPLE EMBODIMENTS OF THE INVENTION

In certain example embodiments of this invention, coated articles are provided that block significant amounts of UV radiation, either alone or in combination with IR radiation. Such coated articles may be used in the context of windows such as architectural windows, heat strengthened windows, tempered windows, IG window units, vehicle windows, and/or the like.

In certain example embodiments of this invention, a UV blocking coating 35 and an organic polymer top coating 40 may optionally be provided on a glass substrate over a heat treatable low-E (low emissivity) coating 30.

Figure 7:
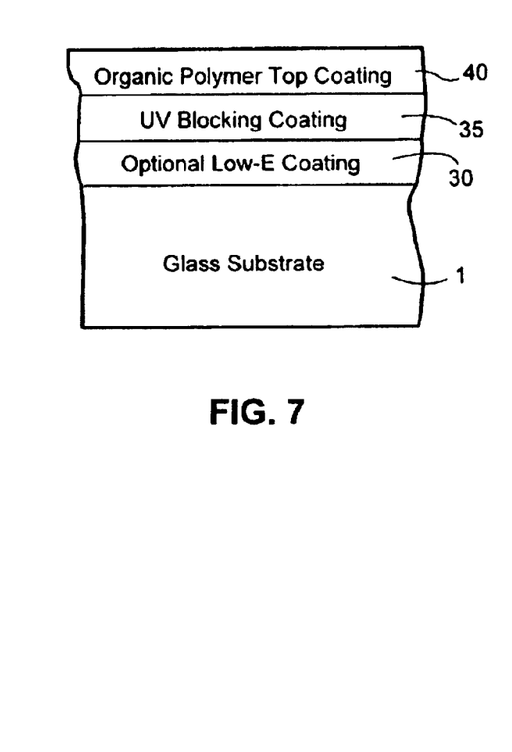
FIG. 7 is a cross sectional view of a coated article according to an example embodiment of this invention, illustrating the provision of a UV blocking on a glass substrate over a low-E coating.

Referring to FIG. 7, the UV blocking coating 35 is then formed on the glass substrate 1, either directly on the glass substrate 1 or possibly over another layer or coating such as an optional low-E coating 30, by spin-coating or in any other suitable manner. In certain example embodiments of this invention, the UV blocking coating 35 may be from about 0.05 to 1.5 µm thick, more preferably from about 0.75 to 1.2 µm thick, and most preferably from about 0.9 to 1.0 µm thick. The UV blocking coating 35 may be of or include a mixture of one or more oxides of titanium, cerium, and silicon in certain example embodiments of this invention.

The organic polymer top coating 40 is then formed on the glass substrate 1 over the UV blocking coating 35, directly or indirectly. In certain embodiments of the present invention, the organic polymer top coating 40 comprises a photomonomer and/or photopolymer that has been exposed preferably to UV radiation. The photomonomer and/or photopolymer may be deposited in any suitable manner, for example, by spin-coating. In certain embodiments, roller-coating and spray-coating are preferred manufacturing processes.

The term "photomonomer" should be understood to mean a radiation curable monomer, which also include further polymerizable oligomers and polymers. Rapid curing of such a monomer may result, for example, from any stimulus that generates free radicals and ions. For example, free radical initiation can be effectively provided by a source of UV light or electron beams. The photomonomer and/or photopolymer may basically comprise a polyester, acrylic, polyurethane or any of a number of general groups generally known to those skilled in the art. For example, the photomonomer and/or photopolymer may comprise UV-curable epoxies and/or UV-curable acrylates, such as, for example, commercially available UV-curable epoxies and/or UV-curable acrylates, including those available from Redspot, Vantec, Tangent, Dymax, Loctite, etc. In certain example embodiments of this invention, the organic polymer top coating 40 may be from about 5 to 10 µm thick, more preferably from about 6 to 9 µm thick, and most preferably from about 7 to 8 µm thick.

In certain embodiments of the present invention, the organic polymer top coating 40 comprises a thermal-cured polymer, such as Bani-M, a polyimide precursor available from Maruzen Petrochemical Co., dissolved in MEK (methyl ethyl ketone) as well as P-84, a polyimide available from HP Polymers Inc., dissolved in NMP(N-methylpyrrolidone) solvent as top coats. In other embodiments, other soluble polymers, such as PMMA, PVB, etc., are also contemplated. In yet further embodiments, other heat cure polymer systems such as epoxy resins cured by amines, imidazoles, etc. are also contemplated as organic top coating 40.

In certain example embodiments of this invention, the UV blocking coating 35 may be formed as follows. A liquid coating solution (for a UV blocking coating that blocks significant amounts of UV radiation) is prepared by forming a coating sol comprising titania, ceria, and silica. The coating sol is then deposited on a substrate (such as a glass substrate) via any suitable method, such as spin coating. The coating sol is then cured in a single-step or multiple-step process using heat from a hot plate and/or oven.

In certain example embodiments, titanium alkoxides as metal organic compounds may be used as the source of titania in the coating sol. Titanium alkoxides include, for example, titanium tetramethoxide, titanium tetraethoxide, titanium isopropoxide, titanium n-propoxide, titanium tetra n-butoxide, titanium tetraisobutoxide, titanium methoxypropoxide, and titanium dichloride diethoxide. The titanium alkoxide sol may be at least partially pre-hydrolyzed in certain example instances. In certain example embodiments, the mole percentage of titania in the coating sol may include from about 1-40% titania, more preferably from about 10-35% titania, more preferably from about 13-25% titania, and most preferably from about 20-25% titania. Optionally, titanium oxalate and/or nitrate may be used as a metal organic compound as a starting material for the titania sol.

In certain embodiments, cerium nitrates, cerium chloride, cerium ethylhexanoate, and/or ceric ammonium nitrate may be used as the source of ceria in the coating sol, although other, known types of cerium-containing compounds and materials may instead be used. In certain example embodiments, the mole percentage of ceria in the coating sol may include from about 1-40% ceria, more preferably from about 10-35% ceria, more preferably from about 13-25% ceria, and most preferably from about 20-25% ceria.

In certain embodiments, a silane and/or a silica (such as a colloidal silica) may be used as the source of silica in the coating sol, although other, known types of silicon-containing compounds and materials may instead be used. In certain embodiments, for example, the source of silica may comprise any silane containing at least one hydrolysable alkoxides functionality, such as TEOS (tetraethyl orthosilicate), MTS (methyl triethoxy silane), gamma-aminopropyl triethoxy silane etc. (available from Aldrich and Gilest). In certain embodiments, glycidoxypropyl trimethoxysilane (GLYMO) and/or colloidal silica (e.g., colloidal silica in methyl ethyl ketone supplied by Nissan Chemicals Inc.) are suitable. In certain example embodiments, the mole percentage of silica in the coating sol may include from about 20-99% silica, more preferably from about 30-80% silica, more preferably from about 35-70% silica, and most preferably from about 50-60% silica. In certain example embodiments (e.g., described below), the mole percentage of silica in the coating sol may include from about 0-25% silica, more preferably from about 0-10% silica, and most preferably from about 0-5% silica.

In certain embodiments, the coating sol comprising titania, ceria, and silica may be stabilized by at least one additive. An alcohol may be used as a solvent in the wet coating solution in certain example instances. Examples of compounds that may be used as stabilizer additives include glycols, alcohols (including, for example, alcohols having high boiling points, methanol, ethanol, propanols, etc.), polyols, beta-diketones, amines, amino alcohols and acetic acid esters. Examples of additives that may be used as a stabilizer in the wet coating solution include mono and dialkyl ethers of ethylene glycol and/or propylene glycol, acetyl acetone, acetoacetic acid, cyanoethylacetate, ethylacetoacetate, polyethylene glycols, caprolactone polyols, acrylic polyols, triethanol amine, methyl diethanol amine, and EDTA. One suitable additive is Tonepolyol 0210 available from the Dow Chemical Co. Suitable polyols are also available from Solvay.

In certain embodiments, the coating sol comprising titania, ceria, and silica may further comprise water and an acid. The acid may assist in initiating any reactions. Suitable acids include strong and/or weak acids, such as acetic acid, hydrochloric acid, sulfuric acids, and other known acids.

The coating sol may then be applied (e.g., via spin coating) on a glass substrate, optionally over a low-E coating 30. The coating is initially cured on a hot plate for a period of time at a temperature of from about 80-200 degrees C. (e.g., about 130 degrees C.) for about 3-10 minutes (e.g., about 5 minutes), and may then be heated in an oven at from about 150-300 degrees C. (e.g., at about 250 degrees C.) for from about 3-10 minutes (e.g., about 5 minutes) for curing the UV blocking coating. The UV blocking coating 35 was thus made up of a mixture of oxides of silicon, cerium, and titanium (e.g., $SiO_2/CeO_2/TiO_2$) in this example embodiment.

The photomonomer and/or photopolymer may then be applied (e.g., via spin coating) on the UV blocking coating 35. The organic polymer top coating 40 may then be formed by exposing the photomonomer and/or photopolymer to radiation, such as UV radiation.

The coated article may then be thermally tempered in a tempering furnace at a temperature of at least about 400 degrees C., more preferably at least about 625 degrees C. for a period of time sufficient to thermally temper the glass substrate 1 (e.g., about 5 minutes). Thus, in certain embodiments, the result may be a thermally tempered coated article including the low-E coating 30 provided on the glass substrate 1 for blocking significant amounts of IR radiation (if coating 30 is present), the UV coating 35 provided on the glass substrate 1 for blocking significant amounts of UV radiation, and the organic polymer top coating 40 provided on the glass substrate 1 for assisting in the improvement of physical characteristics of the article (e.g., see FIGS. 6-7).

In other example embodiments, the UV blocking coating 35 may be made of or include a mixture of oxides of cerium and silicon (e.g., $CeO_2/SiO_2$), a mixture of oxides of titanium and silicon (e.g., $TiO_2/SiO_2$), and/or a mixture of oxides of cerium and titanium (e.g., $CeO_2/TiO_2$). In other exemplary embodiments, a coating sol for a UV blocking coating 35 that blocks significant amounts of UV radiation may comprise any combination known to have UV blocking characteristics. For example, the UV blocking coating 35 may comprise at least one metal oxide from the group consisting of ceria, titania, zinc oxide, bismuth oxide, tin oxide and antimony oxide, and/or a precursor of at least one of these metal oxides The coated article (e.g., comprising the glass substrate, optionally the low-E coating, the UV blocking coating, and the organic polymer top coating) may be used in various applications.

Also, the coating 35, 40 may have a refractive index ranging from about 1.55 to 1.85, more preferably from about 1.6 to 1.8, and most preferably from about 1.65 to 1.75 in certain example embodiments of this invention. Such refractive index values have been found to be advantageous for antireflection purposes.

The following examples of different embodiments of this invention are provided for purposes of example and understanding only, and are not intended to be limiting unless expressly claimed.

EXAMPLES

Coating sols were prepared by mixing cerium(III) nitrate hexahydrate (available from Sigma-Aldrich), titanium tetrabutoxide and glycidoxypropyl trimethoxysilane (GLYMO) in mole proportions listed in the Table 1 in n-propanol containing about 20% by weight of acetic acid. About 4 times excess moles of water was added to initiate reactions. About 5-10% by weight of Tonepolyol 0210 (available from the Dow Chemical Co.) was also added to all the coating sols. Base coatings of ceria, titania and silica precursors were formed on soda lime glass substrates by the spin coating method. Coatings on glass substrates were initially cured on a hot plate at about 130° C. for about 5 minutes, followed by heating in an oven at about 250° C. for about 5 minutes. A UV curable monomer composition was applied to all the glass substrates coated with the base coatings. UV curable monomer composition was a mixture of 96 wt % of Cyracure UVR-6107, a cycloaliphatic epoxide resin obtained from Dow and 4 wt % of Cyracure UVI-6976, a cationic photoinitiator obtained from Dow. An organic polymer top coating was formed by exposing the UV curable monomer composition on all the base coatings listed in Table 1. Coated glass substrates having both the base coating and the top coating were fired in a box furnace at about 625° C. for about 5 minutes. Optical performance of the ceria-titania-silica coatings and the data is shown in Tables 1 to 3 and in FIGS. 1-5.

TABLE 1

Mole % Composition of Silica, Ceria and Titania (base coat)

| Coating No. | $SiO_2$ mole % | $CeO_2$ mole % | $TiO_2$ mole % | RPM/ Time (s) | Base Coat Thickness (μm) | Base Coat Thickness (μm) | Base Coat Refractive Index |
|---|---|---|---|---|---|---|---|
| 1 | 72.8% | 13.5% | 13.5% | 1200/20 | 1.00 | 8 | 1.58 |
| 2 | 66.6% | 16.5% | 16.5% | 1200/20 | 1.00 | 7 | 1.60 |
| 3 | 59.4% | 20.5% | 20.5% | 900/20 | 1.15 | 7.5 | 1.66 |
| 4 | 59.4% | 20.5% | 20.5% | 1000/20 | 1.00 | 7 | 1.66 |
| 5 | 59.4% | 20.5% | 20.5% | 1200/20 | 0.91 | 7 | 1.66 |
| 6 | 52.1% | 24.0% | 24.0% | 1000/20 | 0.89 | 8 | 1.76 |
| 7 | 52.1% | 24.0% | 24.0% | 900/20 | 0.96 | 7.5 | 1.76 |
| 8 | 37.2% | 31.4% | 31.4% | 900/20 | 0.76 | 7.5 | 1.96 |

TABLE 2

Optical Performance (Transmission) of Silica, Ceria and Titania

| Coating No. | $SiO_2$ mole % | % $T_{uv}$ | % $T_{vis}$ | L* | a* | b* | $T_{dw}$ |
|---|---|---|---|---|---|---|---|
| 1 | 72.8% | 14.17 | 86.59 | 94.56 | −1.50 | 3.88 | 63.49 |
| 2 | 66.6% | 10.26 | 87.82 | 95.08 | −1.71 | 3.69 | 62.66 |
| 3 | 59.4% | 4.94 | 88.60 | 95.41 | −2.41 | 4.45 | 59.70 |
| 4 | 59.4% | 5.58 | 87.53 | 94.96 | −2.37 | 4.49 | 59.39 |
| 5 | 59.4% | 7.09 | 88.86 | 95.52 | −2.10 | 3.54 | 61.82 |
| 6 | 52.1% | 4.00 | 87.49 | 94.94 | −2.55 | 4.67 | 58.14 |
| 7 | 52.1% | 2.97 | 85.95 | 94.29 | −3.15 | 5.51 | 55.80 |
| 8 | 37.2% | 1.63 | 84.24 | 93.56 | −2.74 | 7.76 | 51.75 |

TABLE 3

Optical Performance (Reflectance) of Silica, Ceria and Titania

| Coating No. | SiO$_2$ mole % | Glass side | | | | Film side | | | |
|---|---|---|---|---|---|---|---|---|---|
| | | % R | L* | a* | b* | % R | L* | a* | b* |
| 1 | 72.8% | 8.67 | 35.35 | −0.54 | −0.56 | 8.72 | 35.44 | −0.49 | −0.72 |
| 2 | 66.6% | 9.41 | 36.76 | −1.09 | 0.23 | 9.45 | 36.84 | −0.86 | −0.16 |
| 3 | 59.4% | 9.44 | 36.82 | −1.41 | 0.13 | 9.48 | 36.9 | −0.96 | −0.57 |
| 4 | 59.4% | 9.95 | 37.74 | −0.97 | −0.62 | 10.03 | 37.89 | −0.39 | −1.51 |
| 5 | 59.4% | 9.51 | 36.94 | −1.2 | 1.04 | 9.54 | 37 | −0.93 | 0.69 |
| 6 | 52.1% | 10.11 | 38.04 | −2.06 | 1.95 | 10.37 | 38.51 | −1.86 | 0.91 |
| 7 | 52.1% | 10.59 | 38.88 | −0.53 | 1.38 | 10.78 | 39.21 | 0.41 | −0.27 |
| 8 | 37.2% | 12.11 | 41.39 | −5.46 | 0.1 | 12.29 | 41.67 | −4.38 | −1.96 |

Refractive indices at 550 nm of the ceria-titania-silica coatings decreased with increasing silica concentration. In FIGS. 1-5, all the coatings contained silica which was derived from GLYMO except the coating that was labeled as 37.2% SiO$_2$C which contained 1:1 mole ratio of colloidal silica (Nissan's IPA-ST) and GLYMO.

Figure 1:
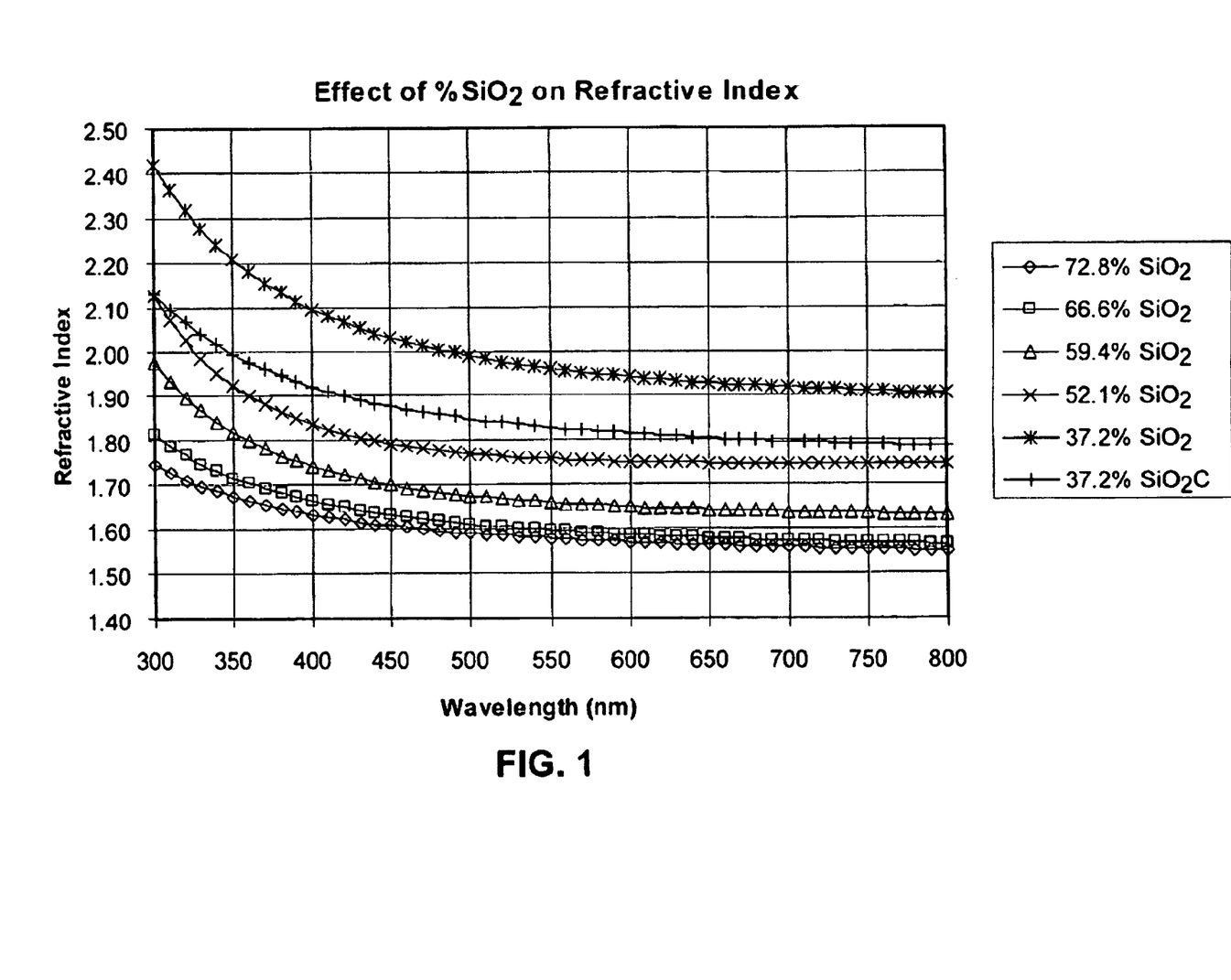
FIG. 1 is a refractive index vs. wavelength graph illustrating the effect of % $SiO_2$ on refractive index in accordance with exemplary embodiments.
Figure 2:
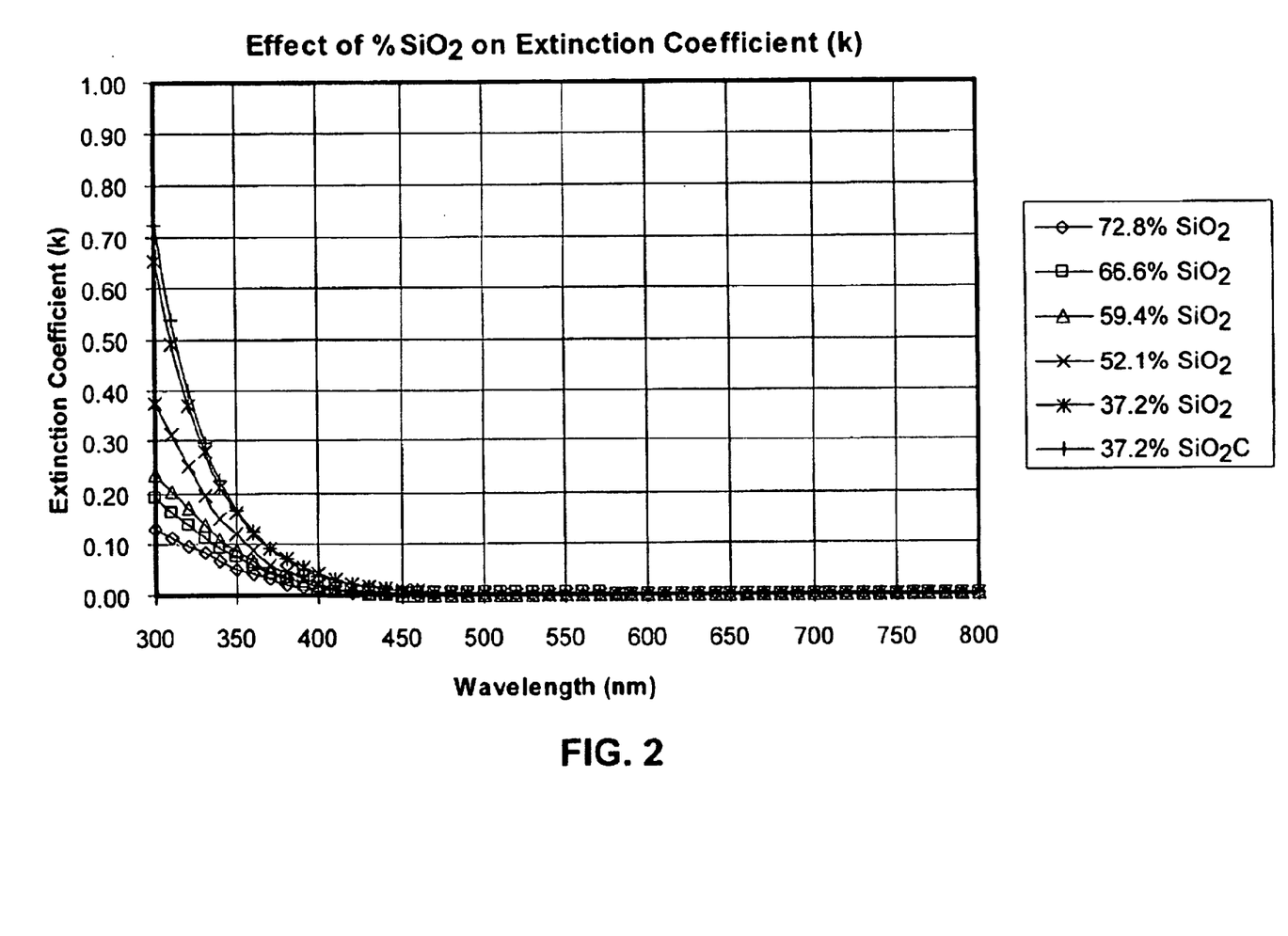
FIG. 2 is a extinction coefficient vs. wavelength graph illustrating the effect of % $SiO_2$ on extinction coefficient in accordance with exemplary embodiments.
Figure 3:
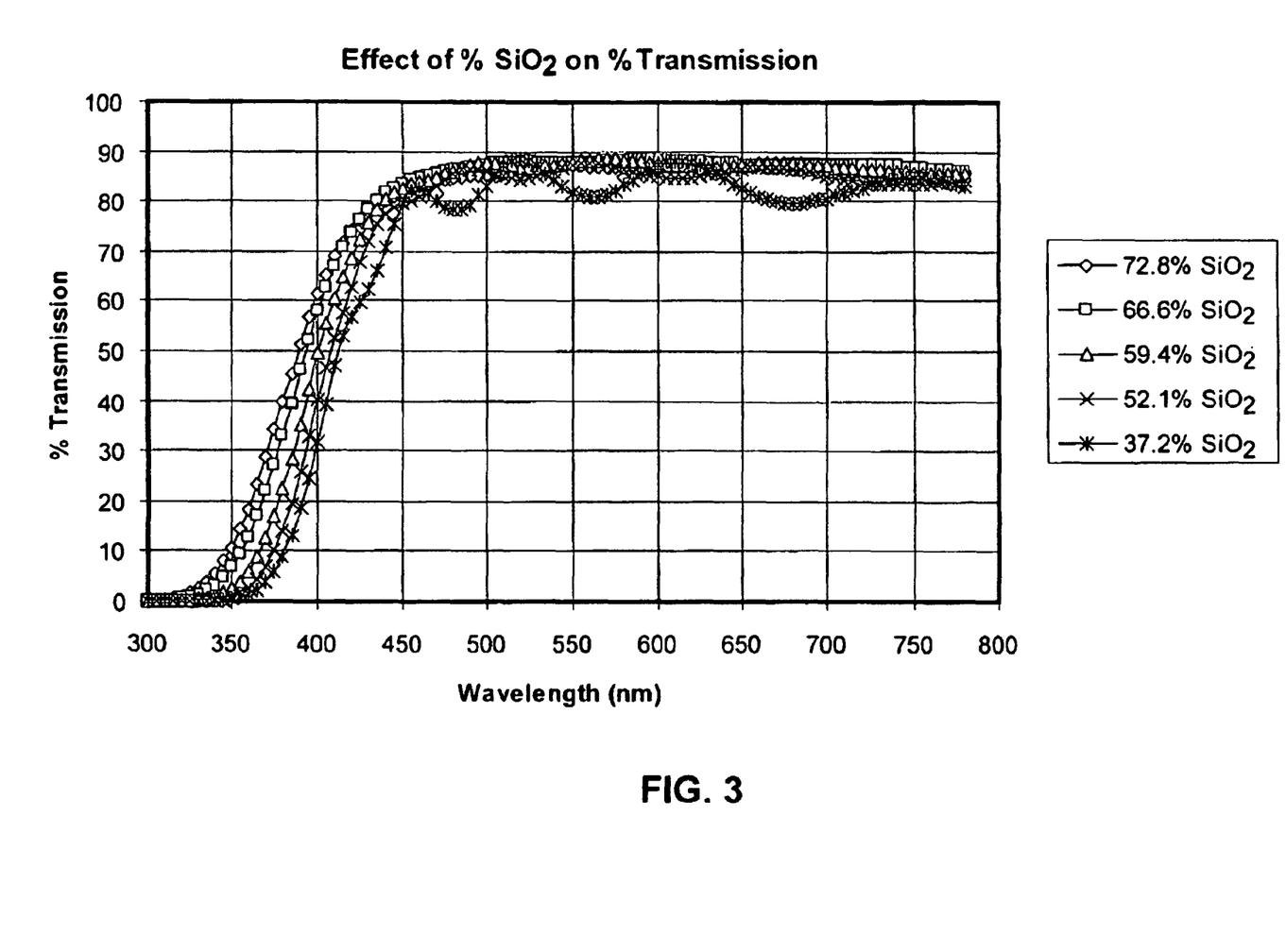
FIG. 3 is a transmission (% T) vs. wavelength graph illustrating the effect of % $SiO_2$ on transmission (% T) in accordance with exemplary embodiments.
Figure 4:
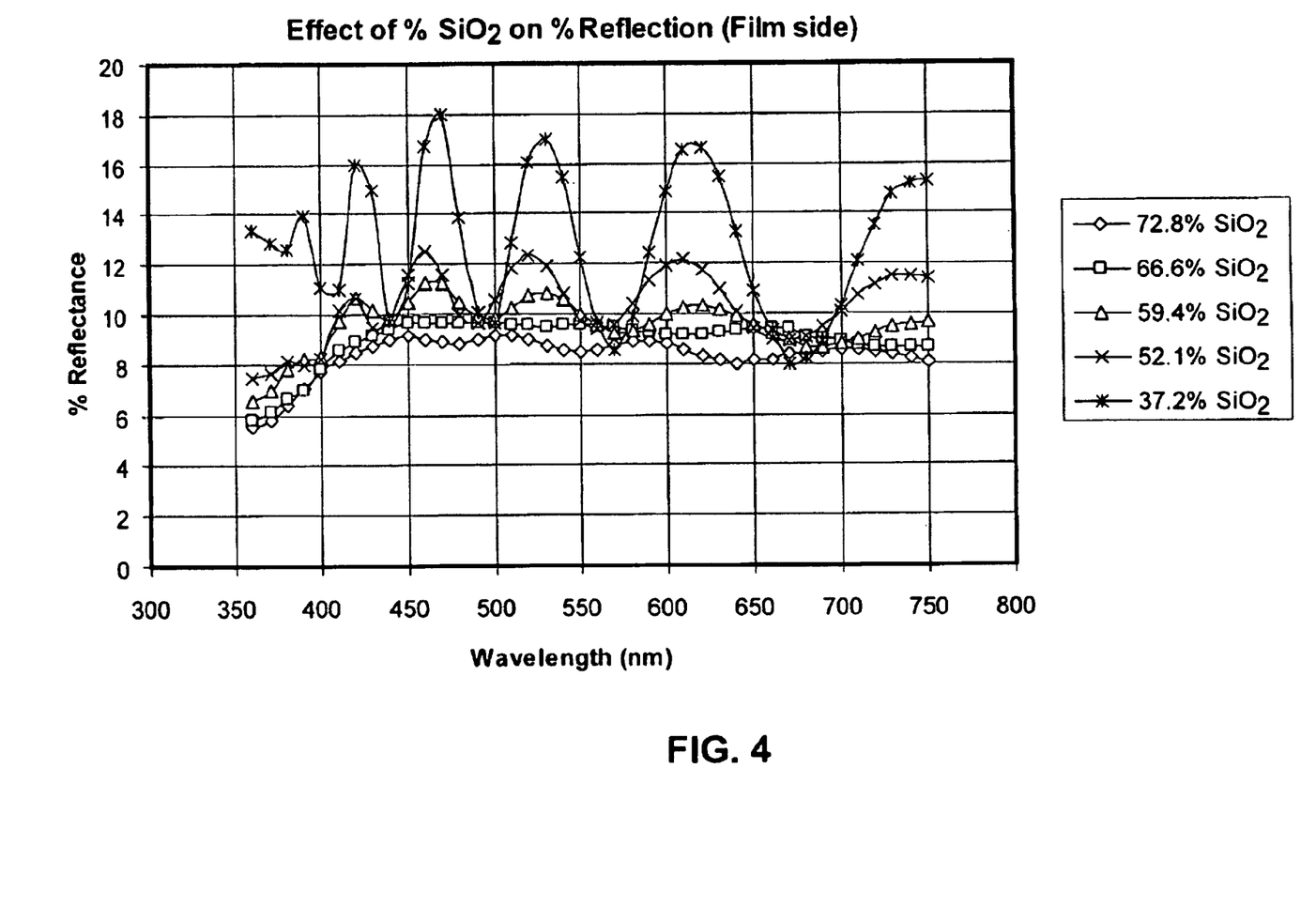
FIG. 4 is a % reflectance vs. wavelength graph illustrating the effect of % $SiO_2$ on reflectance (film side) in accordance with exemplary embodiments.
Figure 5:
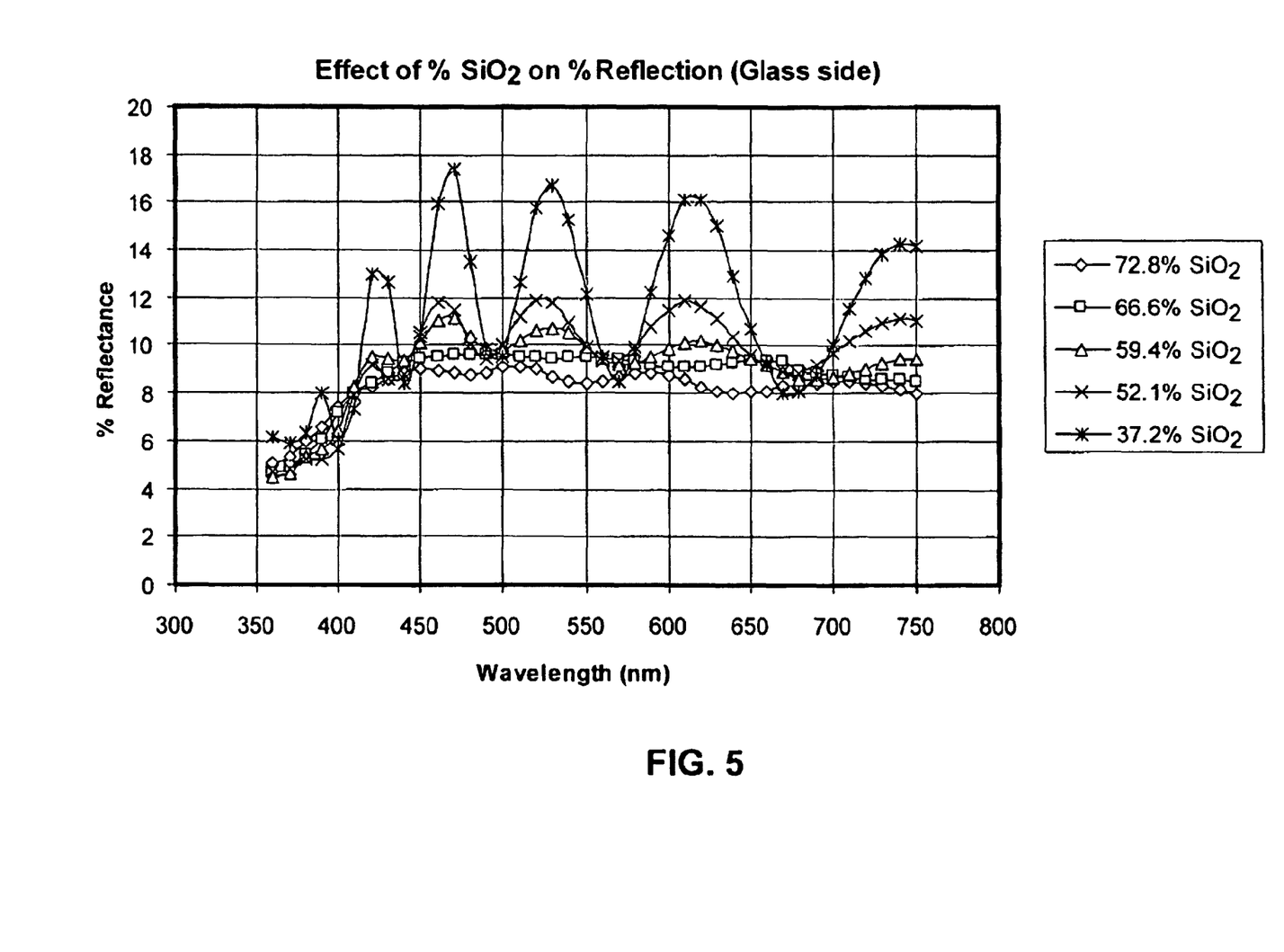
FIG. 5 is a % reflectance vs. wavelength graph illustrating the effect of % $SiO_2$ on reflectance (glass side) in accordance exemplary embodiments.

The figures demonstrate the effect of increasing silica content on optical properties of ceria-titania coatings of equimolar composition. As shown in Table 1, columns 3 & 4, the ceria and titania concentrations were kept equal to each other in all coatings while the concentration of silica is varied. FIG. 1 shows that as the concentration of silica increased the refractive index of coating decreased and data at 550 nm is shown in Table 1, last column. FIG. 2 shows that the molar extinction coefficient of coatings in the UV region decreased with increasing concentration of silica due to the effect of dilution of ceria-titania complex chromophore. This is manifested in the form of higher % T$_{uv}$ in the region 300-380 nm, which is a measure for UV blocking efficiency, for coatings having comparable thickness as shown in Table 2. Base coat thickness data is shown in Table 1. FIG. 3 demonstrates the same effect that the wavelength at which UV radiation is blocked (lowering of transmission) moved towards lower wavelengths as the concentration of silica increased. In addition, it also demonstrates that the interference effects in the visible region of spectrum could be minimized by increasing silica concentration in the ceria-titania-silica coatings. FIGS. 4 and 5 show that the film side and glass side reflection of coated glass substrates decreased with increasing concentration of silica in coating and the data is shown Table 3. As a result of this, the % T$_{vis}$ of the coatings increased with increasing concentration of silica.

The low-E coating is optional in certain example embodiments of this invention. A low-E coating typically includes at least one infrared (IR) blocking layer of or including a material such as silver or gold for blocking significant amounts of IR radiation, where the IR blocking layer is located between at least first and second dielectric layers. Example materials of the dielectric layers include silicon nitride, tin oxide, zinc oxide and so forth, including other art-recognized materials such as other metal oxides. Any suitable low-E coating 30 may be used, and the example low-E coatings discussed herein are provided for purposes of example only. The combination of coatings 30, 35, and 40 on the glass substrate permits the coated article to block significant amounts of both UV and IR radiation which may have been heretofore difficult to achieve. Low-E coatings, while able to block significant amounts of IR radiation, are typically deficient when it comes to blocking UV radiation. Example optional low-E coatings 30 which may be used in different embodiments of this invention are described, for purposes of example and without limitation, in the following U.S. patent documents the disclosures of all of which are hereby incorporated herein by reference: U.S. Pat. Nos. 7,081,302, 6,936,347, 6,974,630, 6,967,060, 6,942,923, 6,887,575, 3,382,528, 6,576,349, 6,926,967, 6,916,408, 6,632,491, and 6,863,928.

Figure 6:
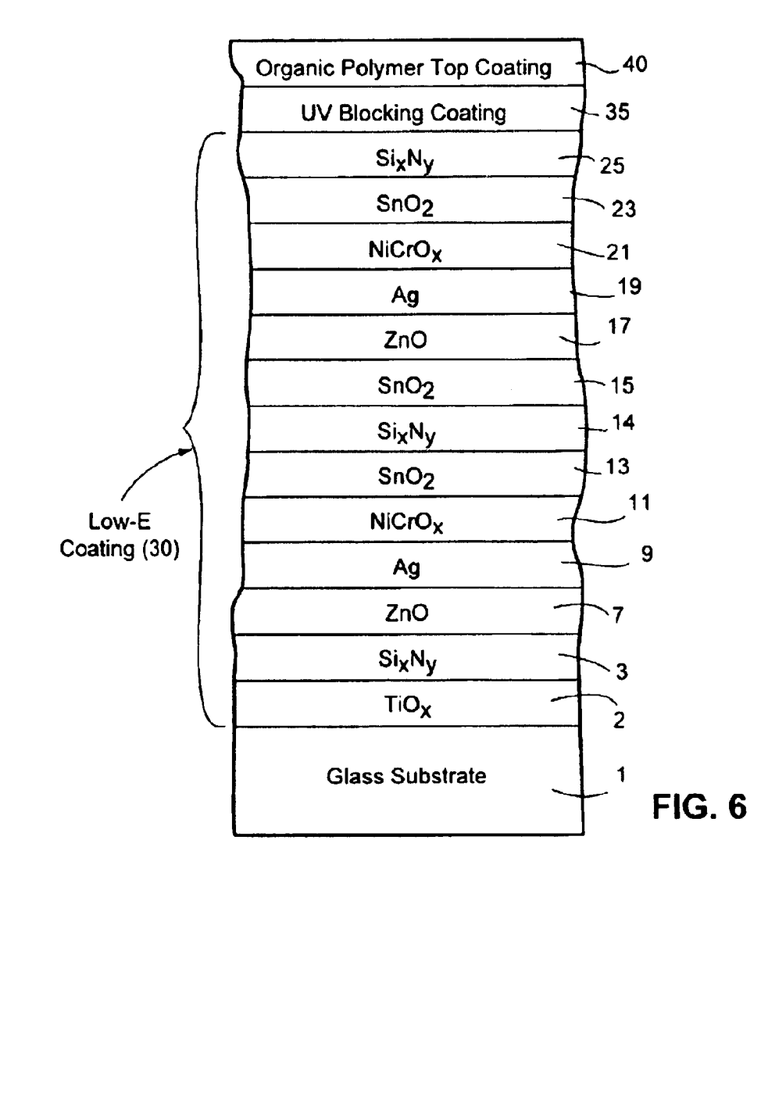
FIG. 6 is a cross sectional view of a coated article according to an example embodiment of this invention, illustrating the provision of a UV blocking on a glass substrate over a low-E coating.

FIG. 6 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and optional low-E coating (or layer system) 30 provided on the substrate 1 either directly or indirectly. The low-E coating 30 includes: bottom dielectric layer 2 which may be of or include titanium oxide (e.g., TiO$_2$) or the like, dielectric silicon nitride layer 3 which may be Si$_3$N$_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride layer 14, tin oxide inclusive interlayer 15, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25 at the interface with the overlying UV blocking coating 35. The "contact" layers 7, 11, 17 and 21 each contact at least one IR reflecting layer (e.g., layer based on Ag). The aforesaid layers 2-25 make up low-E (i.e., low emissivity) coating 30 which is provided on glass or plastic substrate 1. The UV blocking coating 35 is provided on the glass substrate 1 over at least the low-E coating 30. The organic polymer top coating 40 is provided on the glass substrate 1 over at least the UV blocking coating 35.

Dielectric layer 2 is in direct contact with the glass substrate 1, and is optional. Dielectric layer 2 may be of or include TiO$_x$ in certain example embodiments of this invention, where x is from 1.5 to 2.0, more preferably about 2.0. Dielectric layers 3 and 14 may be of or include silicon nitride or other suitable material in certain embodiments of this invention. Any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention. Infrared (IR) reflecting layers 9 and 19 are preferably substantially or entirely metallic and/or conductive, and may comprise or consist essentially of silver (Ag), gold, or any other suitable IR reflecting material.

IR reflecting layers 9 and 19 help allow the coating to have low-E and/or good solar control characteristics. The IR reflecting layers may, however, be slightly oxidized in certain embodiments of this invention. The upper contact layers 11 and 21 may be of or include nickel (Ni) oxide, chromium/ chrome (Cr) oxide, or a nickel alloy oxide such as nickel chrome oxide (NiCrO$_x$), or other suitable material(s), in certain example embodiments of this invention. Dielectric layer 13 may be of or include tin oxide in certain example embodiments of this invention. However, as with other layers herein, other materials may be used in different instances. Lower contact layers 7 and/or 17 in certain embodiments of this invention are of or include zinc oxide (e.g., ZnO). The zinc oxide of layers 7 and 17 may contain other materials as well such as Al (e.g., to form ZnAlO$_x$). For example, in certain example embodiments of this invention, one or more of zinc oxide layers 7, 17 may be doped with from about 1 to 10% Al, more preferably from about 1 to 5% Al, and most preferably about 1 to 4% Al. Interlayer 15 of or including tin oxide or other suitable material is provided under IR reflecting layer 19 so as to be located between silicon nitride layer 14 and zinc oxide layer 17. Dielectric layer 23 may be of or include tin oxide or other suitable material in certain example embodiments of this invention. Dielectric layer 25, which may be an overcoat in certain example instances, may be of or include silicon nitride (e.g., Si$_3$N$_4$) or any other suitable material in certain example embodiments of this invention. Other layer(s) below or above the illustrated coating may also be provided. Thus, while the layer system or coating is "on" or "supported by" substrate 1 (directly or indirectly), other layer(s) may be provided therebetween. Thus, for example, the coatings of FIG. 6 may be considered "on" or "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. The layers of the low-E coating 30 may be formed on the glass substrate by sputtering or any other suitable technique.

Although the above-described ceria-titania inclusive coatings are adequate for some purposes, the inventors of the instant application have discovered that further improvements are still possible. For instance, as indicated above, it would be desirable there to provide UV blocking coatings having enhanced UV blocking efficiency, aesthetic appearances that have reduced amounts of undesirable optical effects (such as yellowish color, interference patterns, etc.), and that are less likely to develop micro-cracks after high temperature heat treatment, along with methods of making the same. In that regard, certain example embodiments of this invention relate to the development of temperable UV blocking coatings having enhanced UV blocking efficiency and aesthetic appearance on stock sheets of glass substrates using large-scale wet coating manufacturing methods. These coatings are useful in applications such as, for example, heat strengthened window, tempered glass windows, etc.

Uniformity of coating thickness is related to controlling the impact of the undesirable optical defects of the coating. Techniques such as, for example, dip coating and spin coating are conventionally employed to produce substantially uniformly thick wet coatings. Unfortunately, however, spin coating sometimes is problematic when it is moved from the lab to a large-scale production line, and dip coating is not readily suitable for single-side applications and high-speed manufacturing. Thus, there also is a need in the art to develop a coating method suitable for high volume manufacturing to cost effectively produce aesthetically acceptable products for large window applications.

The assignee of the instant invention has been able to develop a method for producing precursor coatings that are capable of being subjected to high temperature heat treatment processes to produce thicker oxide coatings that do not develop micro-stress cracks during and/or after the high temperature heat treatment, or develop a reduced amount of micro-stress cracks during and/or after the high temperature heat treatment. This technique generally involves the application of a sacrificial cross-linked organic polymer layer as a top coat over a base coat of precursor oxide layer. Although it burns off cleanly during heat treatment and leaves substantially no residue behind, it has been discovered that the top coat may adversely affect the aesthetic quality of the base coat, especially when thicker top coats are applied. Thus, it has been discovered that the top coat should be applied substantially uniformly over the base coat and have a reduced variation in coating thickness. It therefore would be advantageous to employ a method to apply the top coat substantially uniformly over the base coat in a manner that is suitable for high-volume manufacturing.

Curtain coating and roll coating techniques are known in the silver mirror manufacturing industry. In general, to reduce the amount of corrosion of silver mirror coatings caused by exposure to weather elements, protective paint coatings often are applied by curtain coating processes. To further enhance protection, UV cure top coats often are applied by roll coating processes. These protective coatings typically are very thick. Depending on the example implementation, they sometimes range in thickness from 15-50 microns. Given that these protective coatings are behind a highly reflect and non-transparent silver mirror coating, any imperfections in the top coats are not visible to ordinary observers or users. The thickness tolerance for these protective coatings generally is in the range of 5-15 microns, which generally is not acceptable for optical quality coatings.

Wet coating techniques used to produce coatings on large stock sheets according to certain example embodiments of this invention are similar to the curtain and the roll coating processes used in the silver mirror industry. However, the coating formulations and coating hardware were modified so as to produce substantially uniformly thick coatings with very tight thickness tolerances. Preferably, the thickness variation is less than 15%, more preferably less than 10%, still more preferably less than 5%, and sometimes less than or between 2-3% of target coating thickness for each coating. A curtain coating process was used to provide base coats of oxide precursor materials, whereas roll coat process was used to provide the sacrificial cross-linked organic polymer top coat.

The following examples of different embodiments of this invention are provided for purposes of example and understanding only, and are not intended to be limiting unless expressly claimed.

EXAMPLES

A base coat formulation comprising precursor materials of Zn, Ce, Ti, and Si in appropriate mole ratios was prepared. As noted above, silica may be used in other coatings to lower the refractive index of the overall coating. Because it is colorless and applied in a large amount, it sometimes tends to dilute the yellow/orange color. However, to solve the thickness problems and the associated cracking that occurs, zinc oxide may be used in certain example embodiments to replace at least some of the silica. Zinc oxide is known to be a generally colorless UV blocking additive. The cerium and the titanium provide additional UV blocking properties while improving the overall durability of the coating, which would be an issue if coatings are purely based on pure zinc oxide. Certain example embodiments thus are formed from wet chemical solutions of or including the following materials and mol percents:

| Ingredient | Preferred Mol % | More Preferred Mol % |
|---|---|---|
| ZnO | 55-85 | 65-80 |
| Ceria and Titania, (equal mol % s preferred) | 5-50 | 15-25 |
| Silane | 0-10 | 0-5 |

Wet coatings were deposited on stock sheets of 3.2 mm thick float glass substrates having dimensions of about 183 cm×213 cm using a curtain coating process at a speed of about 90 m/min. The coated glass was subjected to thermal treatment using a tubular oven at a line speed of 3.4 m/min. The base coatings were cured at a temperature less than 300 degrees C., or about 240-270 degrees C. in this example, and the coated glass was allowed to cool in-line before the top coat was applied.

A UV curable acrylic resin was used to form the top coat, and it was applied using a roll coat process. A rubber applicator roller with a suitable durometer was used to produce coatings with a reduced roping pattern and surface texture. The coatings were applied at a 3.4 m/min line speed and the solid coatings were cured by exposure to UV radiation. Although a UV curable acrylic resin was used in connection with this example, other materials may be used in place of or in addition to this material in different embodiments of this invention. For example, an organic sacrificial top coat may be a preformed polymer (such as, for example, PVB, PMMA, etc.), thermally cured polyimide, and/or the like.

The stock sheets of glass coated with the precursor coating stack of the base coat and the top coat was stored and fabricated on-demand to produce UV blocking sheets. In that regard, stock sheets were cut to 61 cm×91 cm and 91 cm×152 cm sizes, and the edges were manually seamed using a dry seaming process. The edge seamed glass was then passed through a mechanical glass washer equipped with rotating drum brushes to remove surface debris before subjecting the sheets to the high temperature heat treatment processes.

A full convection and oscillating furnace was used to heat the glass substrates to well above 625 degrees C. for about 100 sec, which was followed by a quenching using high pressure air. More particularly, about 25,000 psi of air was applied to rapidly quench and produce tempered glass substrates. The pressure was adjusted to about 500-4,000 psi to produce heat strengthened glass substrates.

Optical performance characteristics were gathered from the heat strengthened substrates. The ZnO based coating used in this example yielded a net UV blocking efficiency of over 99% in an insulated glass unit (IGU) configuration having a commercially available tempered, low-E substrate. The coating of this example also exhibited excellent color matching compared with commercial non-temperable UV coatings in corresponding IGU configurations.

The following table provides optical characteristics for a monolithic example embodiment, and an IGU example embodiment.

| | | % | L* | a* | b* |
|---|---|---|---|---|---|
| Monolithic | Tvis | 89.50 | 95.79 | −2.19 | 3.27 |
| | $R_f$ | 8.43 | 34.87 | −0.79 | −1.29 |
| | $R_g$ | 8.44 | 37.87 | −0.84 | −1.12 |
| IGU | Tvis | 71.76 | 87.85 | −3.87 | 4.46 |
| | $R_{inward}$ | 11.28 | 40.05 | −3.01 | 2.17 |
| | $R_{outward}$ | 9.8 | 37.48 | −0.66 | −2.92 |

Figure 8:
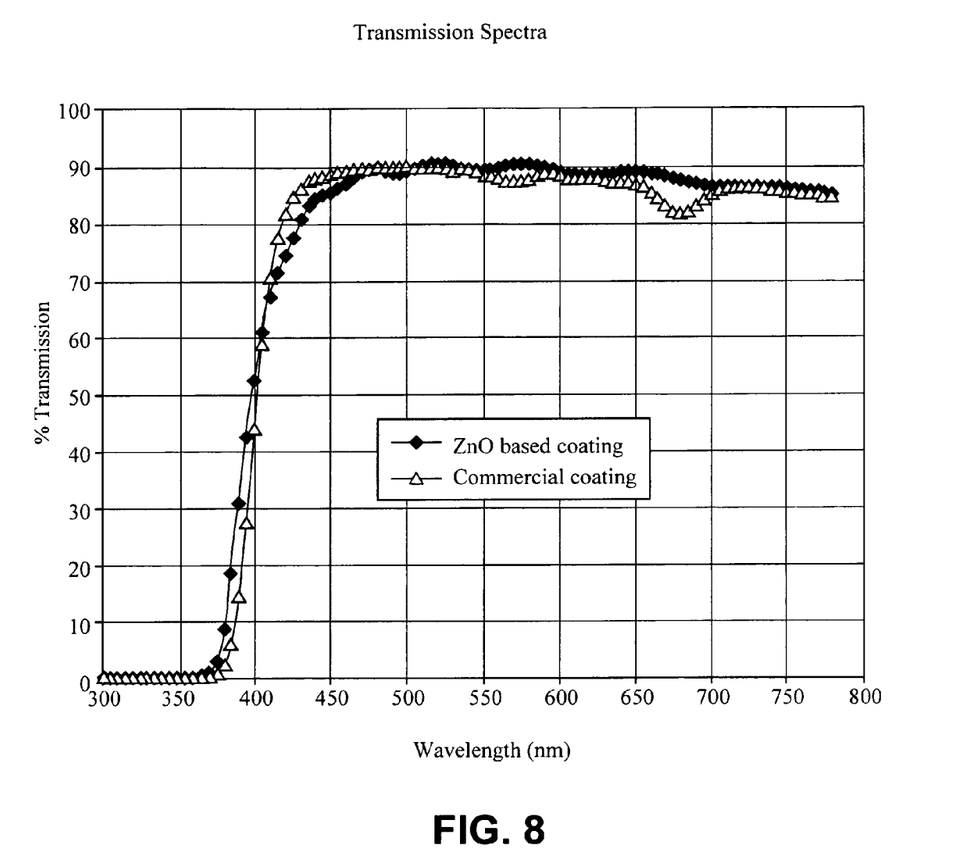
FIG. 8 is a graph plotting percent transmission against wavelength for the zinc oxide based UV blocking coating of certain example embodiments, as well as a commercially available comparative example.

FIG. 8 is a graph plotting percent transmission against wavelength for the zinc oxide based UV blocking coating of certain example embodiments, as well as a commercially available comparative example. It will be appreciated from this graph that the transmission performance is very comparable to one another. However, as noted above, the color matching is improved in connection with the zinc oxide based UV blocking coating of certain example embodiments.

Certain example embodiments are advantageous in that they may incorporate silica to help control the refractive index while also sometimes providing a reduced yellowish color. Certain example embodiments also are advantageous in that color matching may be possible between as-deposited and heat treated implementations.

Certain example embodiments may use curtain coating (e.g., in which a "waterfall" is the curtain in connection with a slot die) for disposing the base coat on the glass and/or roll coating for applying the top coat on the base coat. However, certain other example embodiments may use alternative coating techniques, provided that a sufficient uniformity of materials can be achieved. For instance, the base coat may be applied using spin, spray, meniscus, and/or other coating techniques, and indeed any suitable coating technique may be used to dispose the top coat on the base coat.

It is noted that the glass substrates with the coatings applied thereto may be heat treated in certain example embodiments so that the glass substrate(s) is/are either heat strengthened (e.g., at a temperature of at least around 200 degrees C.) or thermally tempered high temperatures (e.g., at a temperature higher than that involved in heat strengthening such as, for example, at a temperature of at least about 580 degrees C., more preferably at least about 600 degrees C., and often at least about 620 or 640 degrees C.).

Although certain example embodiments have been described as relating to windows applications, it will be appreciated that the techniques described herein may be used in connection with other applications such as, for example, picture frames, refrigerator/freezer doors, bottles, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A method of making a coated article, the method comprising:
providing a glass substrate;
curtain coating an ultraviolet (UV) radiation blocking base coat on the glass substrate, the base coat including oxides of zinc, cerium, titanium, and silicon, wherein the UV blocking base coat is formed from an oxide precursor consisting essentially of 55-85 mol % zinc, 5-50 mol % ceria and titania, and silane in an amount no more than 10 mol %;

curing the base coat;
roll coating a substantially uniformly thick top coat, directly or indirectly, on the base coat, the top coat being a sacrificial cross-linked organic polymer-based layer to be removed from the coated article; and
heat treating the substrate with the base coat and the top coat thereon,
wherein the thickness of the base coat and the top coat of the coated article each respectively has a thickness variation of no more than 15% of target coating thicknesses for each coat prior to the heat treating, and wherein
the top coat is removed from the coated article during and/or after the heat treating without leaving any residues on the base coat, resulting in a substantially crack-free base coat.

2. The method of claim 1, wherein
the base coat is formed from an oxide precursor consisting essentially of 65-80 mol % zinc, 15-25 mol % ceria and titania, and silane in an amount no more than 5 mol %.

3. The method of claim 2, wherein
ceria and titania are provided in substantially equal mol percents.

4. The method of claim 2, wherein
the top coat is a UV curable resin.

5. The method of claim 2, wherein
the top coat is a preformed polymer of or including PVB or PMMA.

6. The method of claim 2, wherein
the top coat is a thermally curable polyimide.

7. The method of claim 2, wherein
the base coat is cured at a temperature of 240-270 degrees C.

8. The method of claim 2, wherein
the heat treating removes substantially all of the top coat from the base coat such that the base coat is substantially crack-free.

9. The method of claim 8, wherein
the base coat and the top coat have respective thickness tolerances of no more than 10% prior to the heat treating.

10. The method of claim 8, wherein
the base coat and the top coat have respective thickness tolerances of no more than 5% prior to the heat treating.

11. The method of claim 8, further comprising cutting and edge seaming the glass substrate into a plurality of smaller substrates prior to the heat treating, and wherein
the heat treating is performed on at least some of the smaller substrates.

12. The method of claim 1, wherein
the base coat is formed from an oxide precursor consisting essentially of 65-70 mol % zinc oxide, 30-35 mol % ceria and titania, remainder silane.

13. The method of claim 12, wherein
ceria and titania are provided in substantially equal mol percents.

14. A method of making a coated article, the method comprising:
providing a glass substrate having located thereon (a) an infrared (IR) radiation blocking coating comprising a low-emissivity coating, (b) an ultraviolet (UV) radiation blocking base coat curtain coated from an oxide precursor material including zinc, cerium, titanium, and silicon, and (c) a substantially uniformly thick sacrificial cross-linked organic polymer-based top coat, to be removed from the coated article, roll coated on the base coat; and
heat treating the substrate with the base coat and the top coat thereon, the heat treating removing all of the top coat from the base coat without leaving any residues on the base coat such that the base coat is substantially crack-free;
wherein the base coat is formed from an oxide precursor consisting essentially of 40-80 mol % zinc, 5-50 mol % ceria and titania, and silane in an amount no more than 10 mol %, and
wherein the thickness of the base coat and the top coat of the coated article each respectively has a thickness variation of no more than 10% of target coating thicknesses for each coat prior to the heat treating.

15. The method of claim 14, wherein
ceria and titania are provided in substantially equal mol percents.

16. The method of claim 15, wherein
the oxide precursor consists essentially of 65-70 mol % zinc, 30-35 mol % ceria and titania, remainder silane.

17. The method of claim 14, wherein
the top coat is a UV curable resin, a preformed polymer of or including PVB or PMMA, or a thermally curable polyimide.

18. The method of claim 17, wherein
the base coat and the top coat have respective thickness tolerances of no more than 5% prior to the heat treating.

19. The method of claim 14, further comprising cutting and edge seaming the glass substrate into a plurality of smaller substrates prior to the heat treating, and wherein
the heat treating is performed on at least some of the smaller substrates.

* * * * *